Sept. 21, 1954    F. RIEBER    2,689,943
FREQUENCY DETERMINING UNIT
Filed March 28, 1946    3 Sheets-Sheet 1
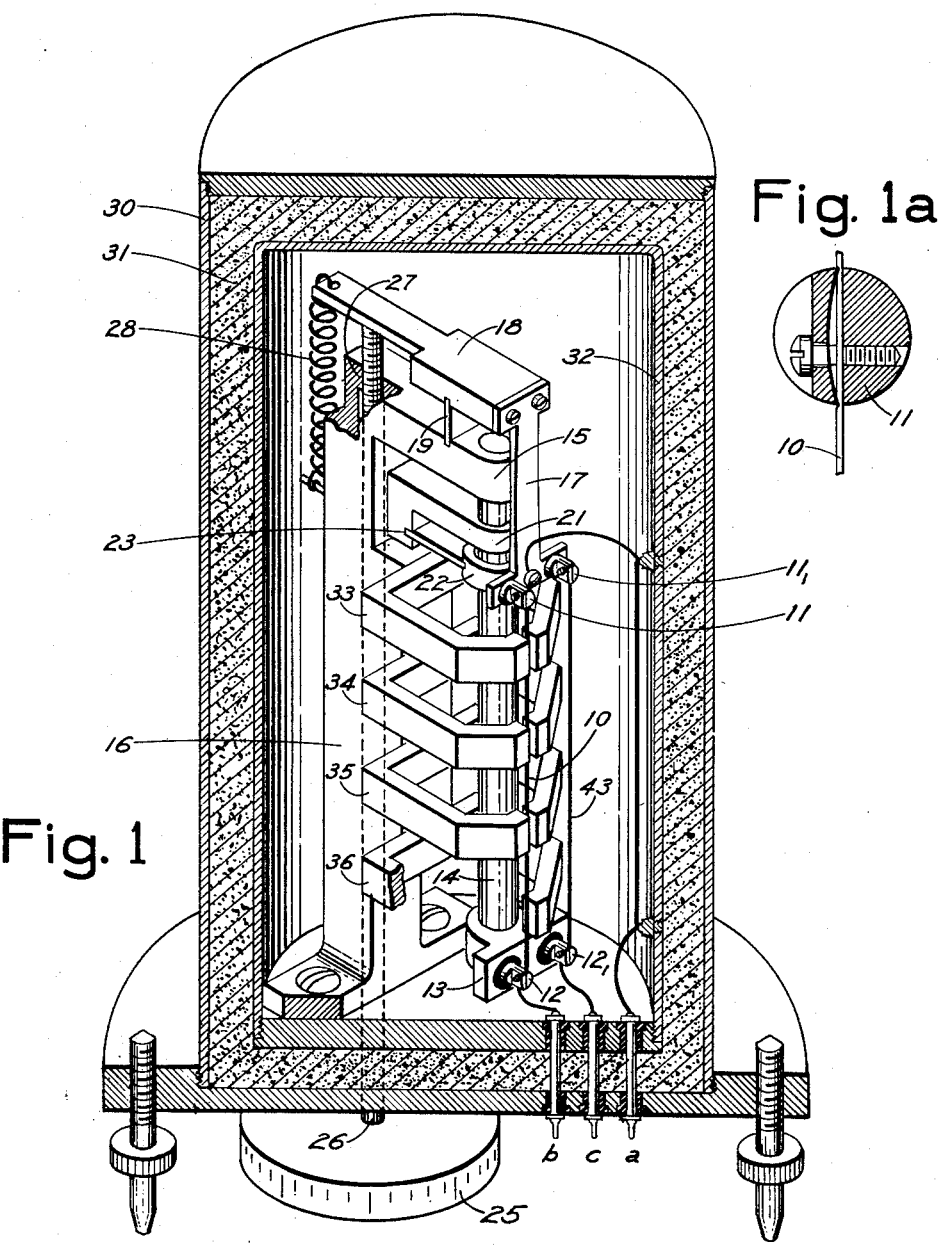
INVENTOR.
FRANK RIEBER Sept. 21, 1954   F. RIEBER   2,689,943
FREQUENCY DETERMINING UNIT
Filed March 28, 1946   3 Sheets-Sheet 2

INVENTOR.
FRANK RIEBER

Sept. 21, 1954    F. RIEBER    2,689,943
FREQUENCY DETERMINING UNIT
Filed March 28, 1946    3 Sheets-Sheet 3
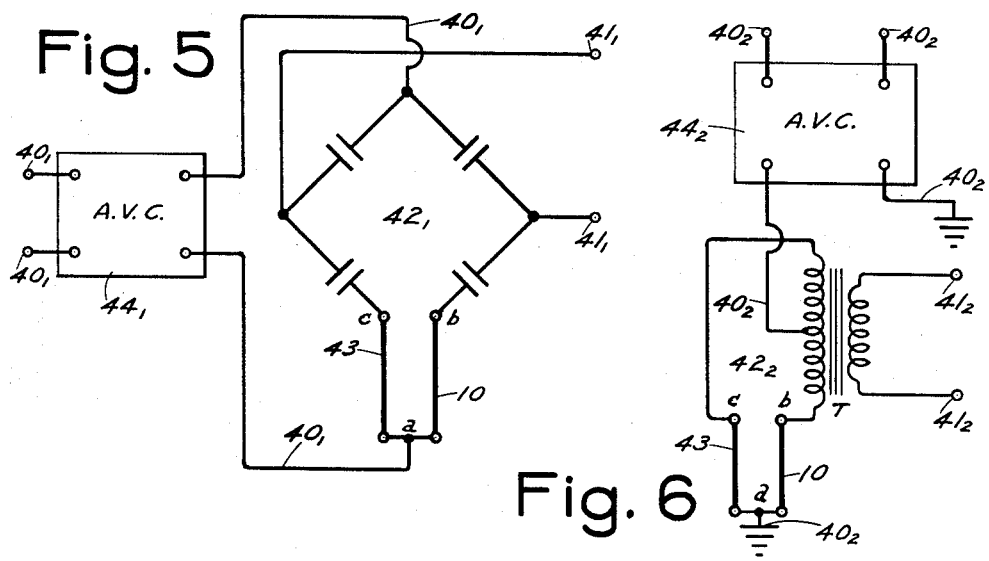
Fig. 5
Fig. 6
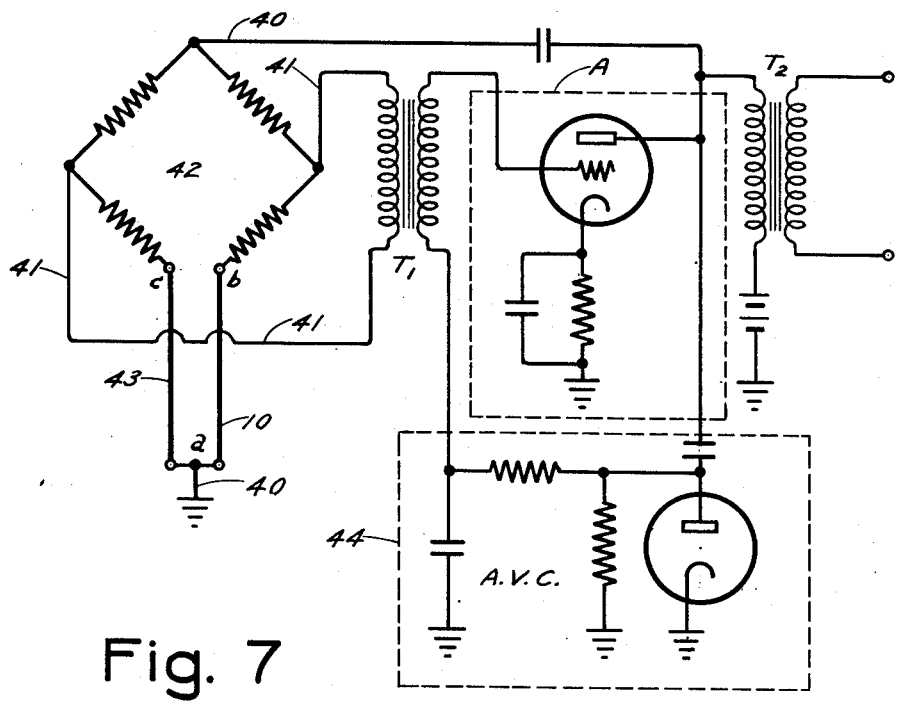
Fig. 7
INVENTOR.
FRANK RIEBER
BY
Byerly, Watson & Simonds
Attorneys Patented Sept. 21, 1954

2,689,943

UNITED STATES PATENT OFFICE 2,689,943

FREQUENCY DETERMINING UNIT

Frank Rieber, New York, N. Y., assignor, by mesne assignments, to Frank S. Streeter, trustee for The Vibrotron Company, Ltd., New York, N. Y., a copartnership Application March 28, 1946, Serial No. 657,880

14 Claims. (Cl. 333—71)

This invention relates to frequency-determining units which are of general application, but more particularly to such devices of the type which may be precisely adjusted to any selected frequency within a wide range of frequencies.

When regulatable control of frequency is required, resort has heretofore been had to balanced electric inductance and capacity elements, one or both of which is regulatable. Such devices, however, fail to provide an accurate and permanent control of frequency at the value to which it may be regulated. They are incapable of sharp tuning and subject to drift. Where accurate control of frequency has been required, resort has heretofore been had to the use of crystals. By the use of a crystal, sharp and accurate control of frequency may be obtained, but only at the resonant frequency of the crystal, which is invariable. There has thus been no frequency controlling means which is both sharp and accurate and also regulatable. Such means are needed in telemetering and for other purposes.

It is an object of the invention, therefore, to provide a new and improved frequency-determining unit which avoids one or more of the above-mentioned limitations and disadvantages of the prior art arrangements.

It is another object of the invention to provide a new and improved frequency-determining unit which is characterized by one or more of the following advantageous characteristics: an accurately reproducible functional relation between adjustment and frequency; an extremely sharply selective and accurate tuning characteristic; a high degree of stability with respect to time and with respect to variations in the characteristics of elements with which it is associated to make up a system, and unusually low losses, that is, a high Q which contributes to its sharp selectivity.

It is a further object of the invention to provide a new and improved electro-mechanical oscillation generator which is particularly adapted to incorporate the frequency-determining unit of the invention.

A device embodying the invention in the form which I now consider most desirable provides a simple means for determining frequency which is both sharp and accurate and at the same time regulatable over a wide range. It includes an adjustable mechanical vibratory element and two electric circuits, one of which supplies energy to the mechanical element to set it into vibration and the other of which receives energy from the vibration of the mechanical element. The mechanical element thus provides a link between the two electric circuits which permits the transfer of energy from one circuit to the other only at the frequency of vibration to which the mechanical element is adjusted. It thus constitutes a filter and like other electrical filters it may be used in the feedback circuit of an amplifier to provide an oscillator.

The mechanical vibratory element is a stretched conductive strand mounted in such manner that its tension may be adjusted over a wide range and when adjusted will not be changed either by internal changes in the strand or its mounting or by changes in external conditions such as temperature. The strand is placed in a constant magnetic field, such as that produced by a permanent magnet, and is set into vibration by passing through it an alternating current whose amplitude is limited by an automatic volume control. The means for avoiding changes in the adjusted tension of the strand and the means for limiting the amplitude of the applied current and consequently the amplitude of vibration of the strand give the strand a definite vibration frequency for each adjusted tension of the strand and insure the maintenance of this frequency after adjustment and the repetition of this frequency when the same adjustment is made again.

In order to make the device sharply tunable, radiation of energy from the vibrating strand is limited. Substantial mechanical radiation of energy into the parts supporting the strand is eliminated by providing for setting the strand into vibration by means of equal and opposite forces on equal parts of the strand. Loss of energy by electrical radiation is limited by making the impedance of the network connecting the two ends of the strand as great or greater than the static resistance of the strand.

While various methods of utilizing the vibrating strand as a link between two electrical circuits may be used, the arrangement which I consider most desirable consists in incorporating the vibrating strand as part of one element of a balanced network so arranged that no current is transmitted from the input circuit to the output circuit except when the strand is in vibration. At the frequency of vibration of the strand, the dynamic impedance of the strand unbalances the circuit and permits the transfer of energy to the output circuit. An accurate balancing of the static resistance of the vibratory strand is obtained by including in the branch of the circuit adjacent to that containing the vibratory strand a resistor consisting of another strand of the same material and dimensions as the vibratory strand. The resistor strand is most desirably at the same temperature and under the same tension as the vibratory strand in order that it may have precisely the same static resistance. The resistor strand creates no dynamic impedance as it is outside the magnetic field in which the vibratory strand is located.

The invention will be further explained in connection with specific embodiments of it which are shown in the accompanying drawings, in which:

Fig. 1 is a perspective view of the mechanical element of the system showing the casing in vertical section and with portions of the framework and casing broken away;

Fig. 1A is a transverse section of one of the clamps holding the ends of the vibratory strand;

Figs. 4, 5 and 6 are wiring diagrams of filters embodying the invention; and

Fig. 7 is a wiring diagram of an oscillator embodying the invention.

Figure 4:
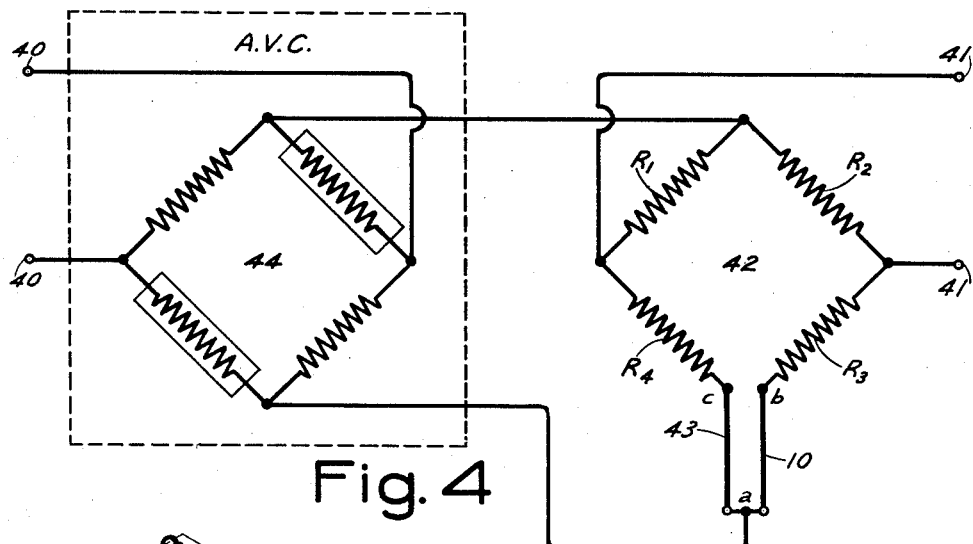

The mechanical element of the device is shown in Fig. 1. The vibratory strand 10 is stretched between two clamps 11, 12. The lower clamp 12 is insulated and secured to a block 13 fixed on the lower end of a rod 14 which is suspended from a forwardly projecting arm 15 at the top of a rigid framework 16. The upper clamp 11 is secured to the lower end of a bar 17 attached to a lever 18 pivoted on a flexible hinge strip 19 mounted on the arm 15 of the frame.

The lower end of the bar 17 is secured against horizontal movement by attachment to a collar 22 loosely surrounding the rod 14 and secured to an arm 21 mounted on the rod 14 by means of a flat piece 23 which is sufficiently flexible to permit slight upward and downward movement of the clamp 11.

The tension of the strand 10 is regulated by a graduated hand wheel 25 mounted on a shaft 26 which extends through the frame 16 and has, near its upper end, a micrometer thread to engage a female thread 27 at the top of the frame. The upper end of the shaft 26 bears against the lever 18, which is held in contact with it by a tension spring 28. It is apparent that turning of the hand wheel will tip the lever 18 and raise or lower the bar 17 and the clamp 11 so as to increase or decrease the tension on the vibratory strand 10.

To avoid a change in the tension of the strand after its tension has been adjusted by the wheel 25, the strand 10 and the parts receiving the stresses resulting from the tension of the strand are made of material free from local strains so that they will not change their dimensions with lapse of time. The strand is made of material which is free from local strains and has no tendency to creep under tension. The parts which are placed under stress by the tension of the strand are the clamps 11, 12, the rod 14 which is put under a compressive stress, the hinge strip 19 which is also under a compressive stress, the bar 17 which is put under a tension stress, the lever 18 which is under a bending stress, the arm 15 of the frame, the projecting upper end of the threaded shaft 26, and the spring 28 which exerts a tension much greater than that of the strand. These parts collectively (with the exception of the spring 28 which may be regarded merely as a connection between the lever and the adjusting shaft) constitute an adjustable stretcher for the strand 10. After the stretcher is assembled, all its parts are subjected to thermal cycling, that is, to alternate heating and cooling, until they are entirely free from local strains.

To prevent changes in temperature from changing the tension of the strand, the strand 10 and the parts of the stretcher which determine the distance between the clamps at the two ends of the strand are thermally balanced. This result may easily be obtained by a proper choice of materials because of the fact that the stretcher for the strand is of composite construction. Thermal expansion of the rod 14 and of fulcrum strip 19 tends to increase the tension on the strand, while thermal expansion of the bar 17 tends to reduce the tension on the strand. A thermal balance is obtained by selecting the materials for these parts in such a way that the thermal coefficient of expansion of the rod 14 multiplied by its length plus the thermal coefficient of expansion of the fulcrum strip 19 multiplied by its height minus the thermal coefficient of expansion of the bar 17 multiplied by its length is equal to the thermal coefficient of expansion of the strand 10 multiplied by its length. This may best be done by selecting for the strand 10 a material of low coefficient of thermal expansion and for the rod 14 a material whose coefficient of expansion is not very much greater than that of the strand 10. The thermal balancing is completed by making the projecting upper end of the shaft 26 and the fulcrum strip 19 of the same length and of the same material, or of materials of the same thermal coefficient of expansion, so that their expansion or contraction with changes in temperature causes no tilting of the lever 18.

The best material which I have found for the strand 10 is cold drawn tungsten. A wire of this material is free from local strains and is not subject to creeping under tension. The tension on such a wire may be brought nearly to the value which ruptures the wire without causing any perceptible creeping. I have found that a tungsten wire of a length of 2½ inches and a diameter of 0.0006 inch, when subjected to a tension of about 10 grams, has a natural period of vibration, in its first mode, of 1200 cycles per second. By stretching such a wire 1/100 of an inch, to a length of 2.51 inches, the tension on the wire is increased to a little over 40 grams and the natural frequency of vibration is brought up to 2400 cycles per second. Thus, by using such a wire of these dimensions in the device described, a movement of only 1/100 of an inch on the part of the upper clamp is required to double the natural frequency of vibration. The micrometer shaft 27 thus provides for continuous adjustment of frequency over a wide range.

A further advantage of using cold drawn tungsten for the strand 10 is that this material has a very low thermal coefficient of expansion. When it is used for the strand 10, the rod 14 may desirably be made of glass-bonded mica. This material has low mechanical hysteresis, is normally free from local strains, and has a thermal coefficient of expansion somewhat greater than that of cold drawn tungsten. A thermal balance may then be obtained by making the bar 17 of aluminum or some other material having a coefficient of expansion greater than that of rod 14.

It will be seen that the mounting which has been described avoids changes in the tension on the strand 10 with changes in temperature, provided that the strand and the parts supporting it are at the same temperature. A uniform distribution of temperature to the different parts of the device is maintained notwithstanding rapid changes in outside temperature by enclosing the strand and its mounting in a casing whose wall has an outer layer 30 of heat conducting material such as metal, an intermediate layer 31 of heat insulation, and an inner layer 32 of heat conducting material. The insulation 31 does not, and is not intended to, maintain a constant temperature within the casing, but it, in combination with the two conducting layers, serves to keep the temperature substantially uniform within the casing and to prevent rapid changes in temperature within the casing. This avoids unequal temperature rises in different elements of the unit which would otherwise occur with rapid temperature changes due to the different thermal inertias of the elements and results in keeping the strand 10 and its mounting always at the same temperature so that the compensating means above described are effective to prevent changes in external temperature from changing the tension on the strand. In order to reduce or eliminate acoustic radiation from the vibratory system, the atmospheric pressure within the container, comprising the elements 30, 31, and 32, may be reduced as by wholly or partially evacuating the container.

In order to set the strand 10 into vibration, an alternating electric current is passed through it from end to end and a magnetic flux is passed across it. The flux density across the strand is made high, for example, 26,000 lines per square centimeter, in order that a current of low amperage may be used. The strand 10 is most desirably made of non-magnetic material, for if it were made of magnetic material the reaction between it and the magnets producing the flux would tend to draw it at right angles to the direction in which it is urged by the reaction between the electric current and the magnetic flux and would tend to make its vibration irregular, and might even bring it into contact with the magnets and prevent it from vibrating when the flux density is high.

Figure 2:
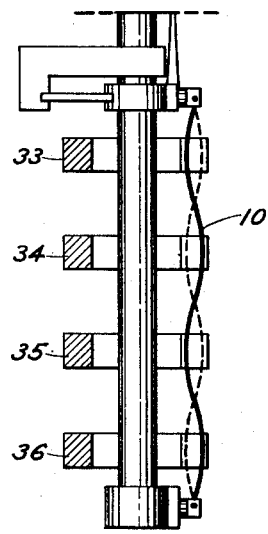
Fig. 2 is a side view of the vibratory strand and the magnets with a portion of the magnets broken away showing positions assumed by the strand in vibration.

In order to set the strand 10 into vibration and at the same time prevent radiation of its vibratory energy into its support, a number of magnets 33, 34, 35, 36 are mounted on the framework 16 with their poles embracing equally spaced portions of the strand 10. Adjacent magnets of the four have their north poles at opposite sides of the strand so that, when an electric impulse is passed through the strand in one direction, its upper quarter and third quarter are urged in one direction by the magnets 33 and 35, while its second quarter and fourth quarter are urged in the opposite direction by the magnets 34 and 36 as shown in Fig. 2. The vibration of equal portions of the strand in opposite phase serves to eliminate the large transfer of mechanical energy from the strand to the frame which would take place if they vibrated in the same phase so as to cause a reaction between the strand and its support.

Figure 3:
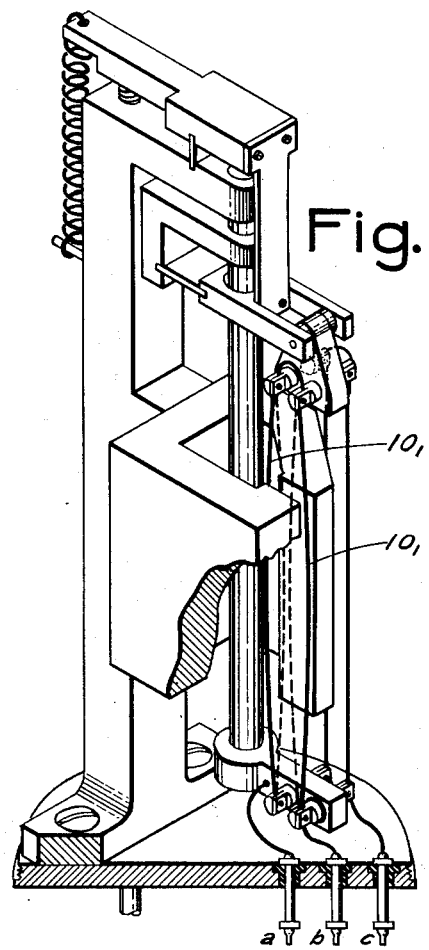
Fig. 3 is a fragmentary perspective view of the mechanical element showing a modified form in which a double vibratory strand is used.

It will be noted that the arrangement of magnets which has been described results in setting the strand into its fourth mode of vibration. The fourth mode of vibration is not essential, but it may be noted that when the strand is set into vibration with equal portions of the wire vibrating in opposite phase, the higher the mode of vibration used, the less will be the transfer of energy to the frame. Dynamic balancing may be obtained even in the first mode of vibration by the use of a double strand $10_1$ in whose halves electric impulses flow in opposite directions, as shown in Fig. 3, so that the two halves vibrate in opposite phase.

Filters incorporating the mechanical element which has been described are shown in Figs. 4, 5 and 6. Fig. 4 shows an input circuit 40 connected to an output circuit 41 by means of a balanced network 42, one of whose arms contains the vibratory strand 10 previously described. The balanced network 42 has the form of a Wheatstone bridge whose upper arms contain equal resistances $R_1$ and $R_2$. One of the lower arms contains a resistor $R_3$ and the vibratory strand 10, while the other lower arm of the bridge contains a resistor $R_4$ and a strand 43 which is precisely like the strand 10 except that it is not in a magnetic field. The resistances of the resistors $R_4$ and $R_3$ are equal.

A very accurate balancing of the resistances of the bridge circuit may be obtained by making the strand 43 of the same material and of the same length as the strand 10 and keeping it at the same temperature as the strand 10 by placing it within the insulating casing which has been described. However, differences in tension cause slight changes in the static resistance of the strand 10, so that, for a perfect resistance balance, the strand 43 should be subjected to the same tension as the strand 10. An arrangement for accomplishing this is indicated in Fig. 1 which shows the strand 43 extended between two clamps $11_1$ and $12_1$ which are mounted on the same supports as the clamps 11 and 12 which hold the ends of the strand 10. When the device is constructed, the initial tension on the strand 43 is made the same as that on the strand 10, and the two tensions remain equal during tension regulation because the ends of the two strands are held by the same supports. Electrical connections $a$, $b$ and $c$ to the strands 10 and 43 are shown in Fig. 1 and indicated by the same letters in Fig. 4.

As shown in Fig. 4, the input circuit 40 is connected to the upper and lower corners of the network 42 while the output circuit is connected to the side corners of the network. As the network is perfectly balanced when the vibratory strand 10 is not in motion, no current will flow in the output circuit when the strand is still. When, however, the input circuit receives an alternating current of a frequency the same as the natural frequency of the strand at the tension to which the strand 10 has been adjusted, the strand 10 will be set into vibration. The vibration of the strand 10 in the magnetic field develops therein a counterelectromotive force in well-known manner, thus developing an effective dynamic impedance greater than its static which will unbalance the bridge and thus allow current of this frequency to pass into the output circuit 41.

To avoid such slight changes in the frequency of vibration of the strand 10 as may occur with changes in its amplitude of vibration, the amplitude of vibration of the strand is limited by placing an automatic volume control 44 in the input circuit. As shown in Fig. 4, the automatic volume control may take the form shown in U. S. Patent 2,025,775 issued to me on December 31, 1935, or it may be of other known type. Its effect is to limit the amperage of the current passed through the strand 10, thus controlling the forces between the parts of the strand and the magnets and so limiting the amplitude of the vibration of the strand. In order that limiting of the current may secure this effect, it is important that the magnetic field in which the strand is placed be maintained constant. This result can best be achieved by producing this field by means of permanent magnets as shown in Fig. 1.

Sharpness of tuning requires that radiation of energy from the vibrating strand be limited. The means for limiting the radiation of mechanical energy have already been described. Limitation of the electrical radiation from the vibrating strand is attained by making the impedance of the network connecting the two ends of the strand 10, including the network 42, the input circuit 40 and the output circuit 41, at least as great as the static resistance of the strand. The network impedance between the ends of the strand may most desirably be made greater than this, and, where sharp tuning is important, should be increased until a further increase causes no substantial increase in the Q of the circuit.

Fig. 5 shows a modified filter in which the balanced network $42_1$ consists of a capacity bridge. The operation is similar to the operation previously described, and electrical radiation from the vibratory strand is limited in the same way.

Fig. 6 shows a third form of filter incorporating the same mechanical element. In this case, the input circuit $40_2$ and the output circuit $41_2$ are linked by a transformer T. The balanced network $42_2$ includes two halves of the primary of the transformer T and the strands 10 and 43. The input circuit is connected to the middle point of the primary coil of the transformer and to a point between the strands 10 and 43. When the network $42_2$ is balanced, the currents through the two halves of the primary are equal and opposite, so that no voltage is induced in the secondary circuit. When, however, the frequency of the incoming current is such as to set the strand 10 into vibration at the frequency to which its tension has been adjusted, the dynamic resistance of the strand unbalances the circuit $42_2$, allowing more current to flow through one-half of the primary than through the other half so that a voltage is induced in the secondary circuit. Thus, the transfer of energy between the circuits occurs as before only when the frequency of the incoming current is that to which the tension of the strand has been adjusted.

Any one of the filters which has been described may be converted into an oscillator by connecting the output circuit to an amplifier and providing a feedback to the input circuit. Fig. 7 shows an oscillator containing the filter circuit shown in Fig. 3, except that a different form of automatic volume control is used.

In the oscillator shown in Fig. 7, the output circuit 41 of balanced network 42 is coupled through a transformer $T_1$ to an amplifier A, and a portion of the plate energy from the tube of the amplifier is fed back into the input circuit 40. In this case, control energy for the automatic volume control is taken from the plate circuit of the amplifier passed through an automatic-volume-control rectifier 44 of conventional design and connected to control the grid bias which determines the gain of the amplifier. The output from the amplifier A is led through a transformer $T_2$ to the point at which the energy from the oscillator is to be used.

What I claim is:

1. A precision frequency-determining unit adjustable over a wide range of frequencies comprising a wire of drawn tungsten and a stretcher for said wire comprising a bar of glass-bonded mica greater in length than the wire having one of its ends secured to one end of the wire, and a bar of aluminum connecting the other end of the mica bar to the other end of the tungsten wire, whereby thermal expansion of the wire is substantially balanced by that of the stretcher; and means for adjusting the spacing of said mica bar and said aluminum bar positively to deform said wire longitudinally, thereby to adjust the natural frequency thereof.

2. A precision frequency-determining unit adjustable over a wide range of frequencies comprising: a pair of spaced relatively adjustably-fixed rigid supports; a tensioned elastic straight conductive strand extending between and rigidly secured to said supports; means for developing a magnetic field transverse to said strand; a supply circuit connected to said strand for impressing thereon signals of a frequency related to the natural frequency of said strand; the field distribution of said magnetic field being such that equal portions of said strand vibrate in mechanical phase opposition; and means for adjusting the spacing of said supports positively to deform said strand longitudinally, thereby to adjust the natural frequency thereof.

3. A precision frequency-determining unit adjustable over a wide range of frequencies comprising: a pair of spaced relatively adjustably-fixed rigid supports; a tensioned elastic straight conductive strand extending between and rigidly secured to said supports; means for developing a magnetic field transverse to said strand; a supply circuit connected to said strand for impressing thereon signals of a frequency related to the natural frequency of said strand; an output circuit for deriving signals from said strand; an electrical impedance network interconnecting said supply circuit, said output circuit, and said strand and proportioned effectively to eliminate the transfer of electrical energy between said supply circuit and said output circuit except that due to vibration of said strand; and means for adjusting the spacing of said supports positively to deform said strand longitudinally, thereby to adjust the natural frequency thereof.

4. A precision frequency-determining unit comprising: a pair of spaced rigid supports; a tensioned elastic straight conductive strand extending between and rigidly secured to said supports; means for developing a magnetic field transverse to said strand of such a field distribution that equal portions of said strand vibrate in mechanical phase opposition; and a supply circuit connected to said strand for impressing thereon signals of a frequency related to the natural frequency of said strand.

5. A precision frequency-determining unit comprising: a pair of spaced rigid supports; a tensioned elastic straight conductive strand extending between and rigidly secured to said supports; a plurality of magnets of alternating polarity disposed along the length of said strand for causing equal portions of said strand to vibrate in mechanical phase opposition; and a supply circuit connected to said strand for impressing thereon signals of a frequency related to the natural frequency of said strand.

6. A precision frequency-determining unit comprising: a pair of spaced rigid supports and a supporting structure extending therebetween; a tensioned elastic straight conductive strand extending between and rigidly secured to said supports; means for developing a magnetic field transverse to said strand of such a field distribution that equal portions of said strand vibrate in mechanical phase opposition; and circuit terminals connected to said strand for translating thereto signals of a frequency related to the natural frequency of said strand, said supports and supporting structure being constructed of parts substantially free of local strains.

7. A precision frequency-determining system comprising: a pair of spaced rigid supports; a tensioned elastic straight conductive strand extending between and rigidly secured to said supports; means for developing a magnetic field transverse to said strand; a supply circuit connected to said strand for impressing thereon signals of a frequency related to the natural frequency of said strand; an output circuit for deriving signals from said strand; and an electrical impedance network interconnecting said supply circuit, said output circuit and said strand and proportioned effectively to eliminate the transfer of electrical energy between said supply circuit and said output circuit except that due to vibration of said strand.

8. A precision frequency-determining system comprising: a pair of spaced rigid supports; a tensioned elastic straight conductive strand extending between and rigidly secured to said supports; means for developing a magnetic field transverse to said strand; an electrical network comprising a bridge circuit including said strand in one arm thereof; a supply circuit connected across one diagonal of said bridge circuit for impressing thereon signals of a frequency related to the natural frequency of said strand; and an output circuit connected across the other diagonal of said bridge circuit for deriving signals from said strand.

9. A precision frequency-determining system comprising: a pair of spaced rigid supports; a pair of tensioned elastic straight conductive strands extending between and rigidly secured to said supports; means for developing a magnetic field transverse to said strands; an electrical network comprising a bridge circuit individually including said strands in two arms thereof; a supply circuit connected across one diagonal of said bridge circuit for impressing thereon signals of a frequency related to the natural frequency of said strands; and an output circuit connected across the other diagonal of said bridge circuit for deriving signals from said strands.

10. A precision frequency-determining system comprising: a pair of spaced rigid supports; a pair of tensioned elastic straight conductive strands extending between and rigidly secured to said supports; means for developing a magnetic field transverse to said strands; an electrical network comprising a bridge circuit individually including said strands in adjacent arms thereof; a supply circuit connected across one diagonal of said bridge circuit for impressing thereon signals of a frequency related to the natural frequency of said strands; and an output circuit connected across the other diagonal of said bridge circuit for deriving signals from said strands.

11. A precision frequency-determining system comprising: a pair of spaced rigid supports; a pair of tensioned elastic straight conductive strands maintained at the same temperature extending between and rigidly secured to said supports; means for developing a magnetic field transverse to said strands; an electrical network comprising a bridge circuit individually including said strands in two arms thereof; a supply circuit connected across one diagonal of said bridge circuit for impressing thereon signals of a frequency related to the natural frequency of said strands; and an output circuit connected across the other diagonal of said bridge circuit for deriving signals from said strands.

12. A precision frequency-determining system comprising: a pair of spaced rigid supports; a pair of tensioned elastic straight conductive strands maintained under the same tension extending between and rigidly secured to said supports; means for developing a magnetic field transverse to said strands; an electrical network comprising a bridge circuit individually including said strands in two arms thereof; a supply circuit connected across one diagonal of said bridge circuit for impressing thereon signals of a frequency related to the natural frequency of said strands; and an output circuit connected across the other diagonal of said bridge circuit for deriving signals from said strands.

13. A precision frequency-determining system comprising: a pair of spaced rigid supports; a tensioned elastic straight conductive strand extending between and rigidly secured to said supports; means for developing a magnetic field transverse to said strand; an electrical network comprising a Wheatstone resistance bridge circuit including said strand in one arm thereof; a supply circuit connected across one diagonal of said bridge circuit for impressing thereon signals of a frequency related to the natural frequency of said strand; and an output circuit connected across the other diagonal of said bridge circuit for deriving signals from said strand.

14. A precision frequency-determining system comprising: a pair of spaced rigid supports; a tensioned elastic straight conductive strand extending between and rigidly secured to said supports; means for developing a magnetic field transverse to said strand; an electrical network comprising a bridge circuit including said strand in one arm thereof; the static resistance of said strand being substantially less than the impedance of any adjacent arm of said bridge circuit; a supply circuit connected across one diagonal of said bridge circuit for impressing thereon signals of a frequency related to the natural frequency of said strand; and an output circuit connected across the other diagonal of said bridge circuit for deriving signals from said strand.

References Cited in the file of this patent

UNITED STATES PATENTS

| Number | Name | Date |
|---|---|---|
| 30,798 | Buchanan | Dec. 4, 1860 |
| 753,475 | Daily | Mar. 1, 1904 |
| 1,556,553 | Woodward | Oct. 6, 1925 |
| 1,863,415 | Rieber | June 14, 1932 |
| 1,920,304 | Hansell | Aug. 1, 1933 |
| 1,933,306 | Berry et al. | Oct. 31, 1933 |
| 1,944,656 | Downing | Jan. 23, 1934 |
| 1,948,104 | Firestone | Feb. 20, 1934 |
| 1,958,696 | Digby | May 15, 1934 |
| 1,995,305 | Hayes | Mar. 26, 1935 |
| 2,174,296 | Wallace | Sept. 26, 1939 |
| 2,240,306 | Lakatos | Apr. 29, 1941 |
| 2,260,847 | Warren | Oct. 28, 1941 |
| 2,265,011 | Siegel | Dec. 2, 1941 |
| 2,327,277 | Lovell et al. | Aug. 17, 1943 |
| 2,412,536 | Rieber | Dec. 10, 1946 |
| 2,546,158 | Johnson | Mar. 27, 1951 |